Feb. 28, 1933.                G. C. CHASE                1,898,996
                           CALCULATING MACHINE
                            Filed Jan. 3, 1930              8 Sheets-Sheet 1
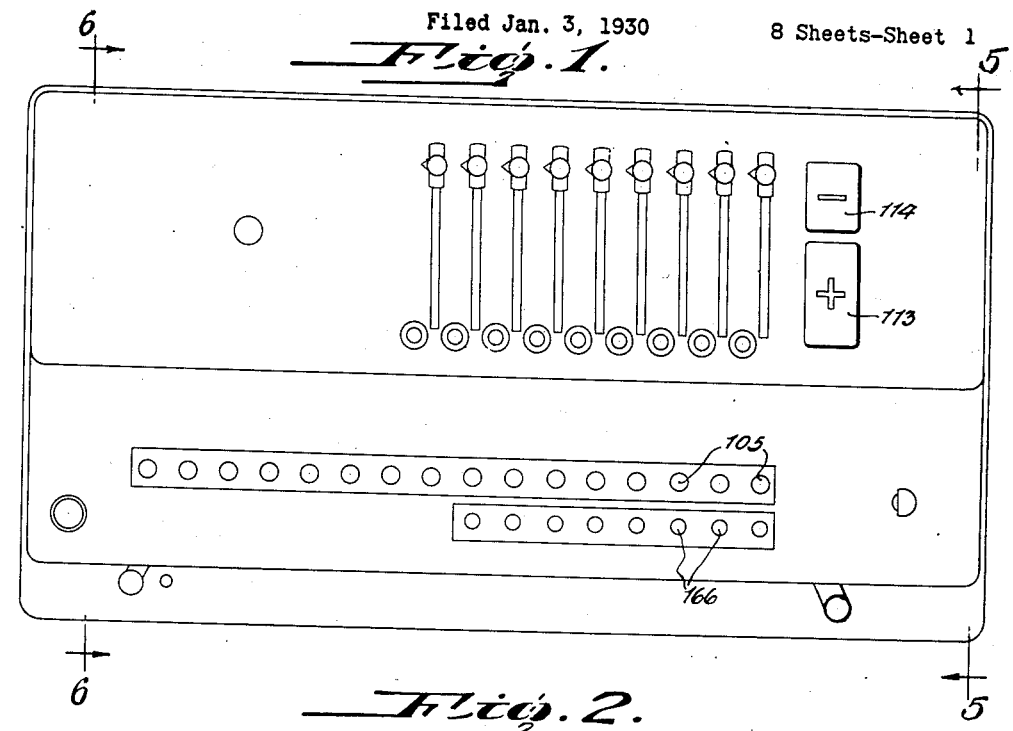
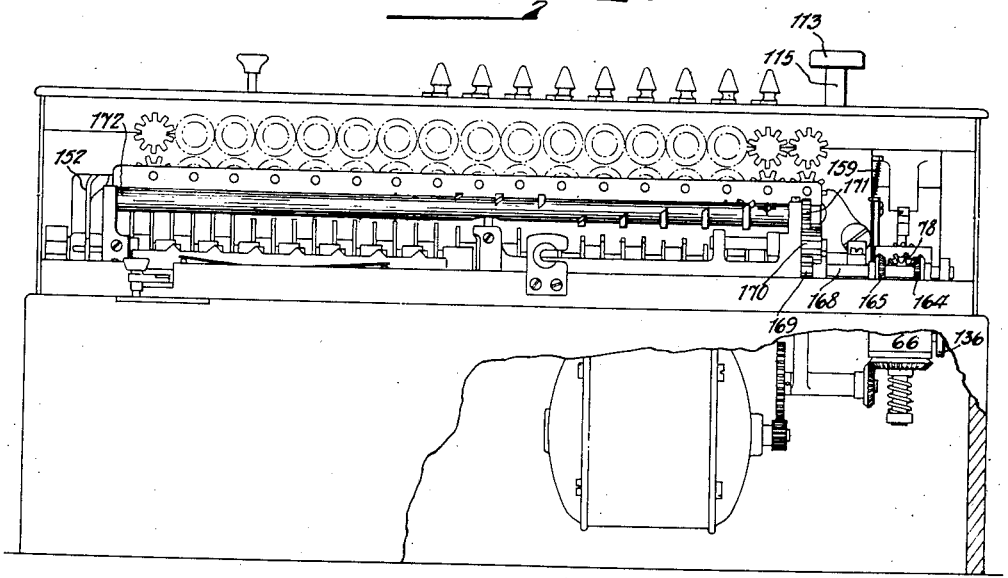
George C. Chase INVENTOR.
BY H. A. Sparks
         his ATTORNEY.

Feb. 28, 1933.  G. C. CHASE  1,898,996
CALCULATING MACHINE
Filed Jan. 3, 1930   8 Sheets-Sheet 2
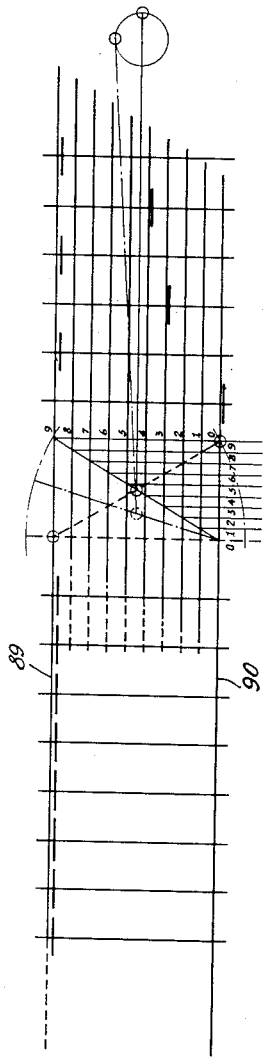
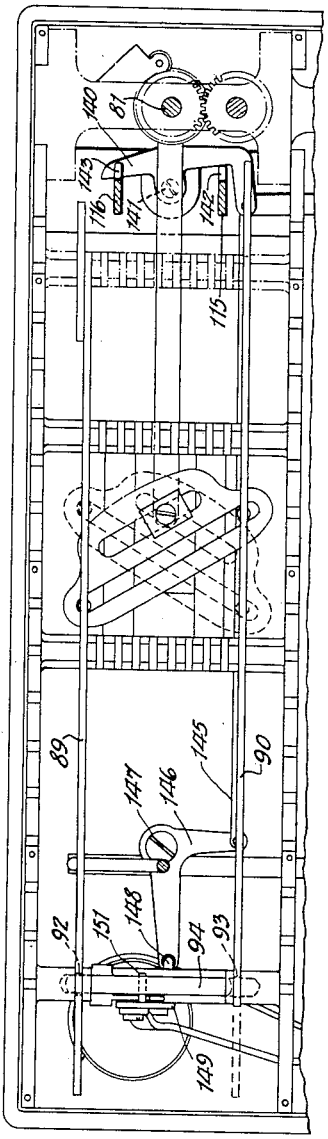
George C. Chase INVENTOR.
BY H. A. Sparks
his ATTORNEY.

Feb. 28, 1933.  G. C. CHASE  1,898,996
CALCULATING MACHINE
Filed Jan. 3, 1930   8 Sheets-Sheet 3
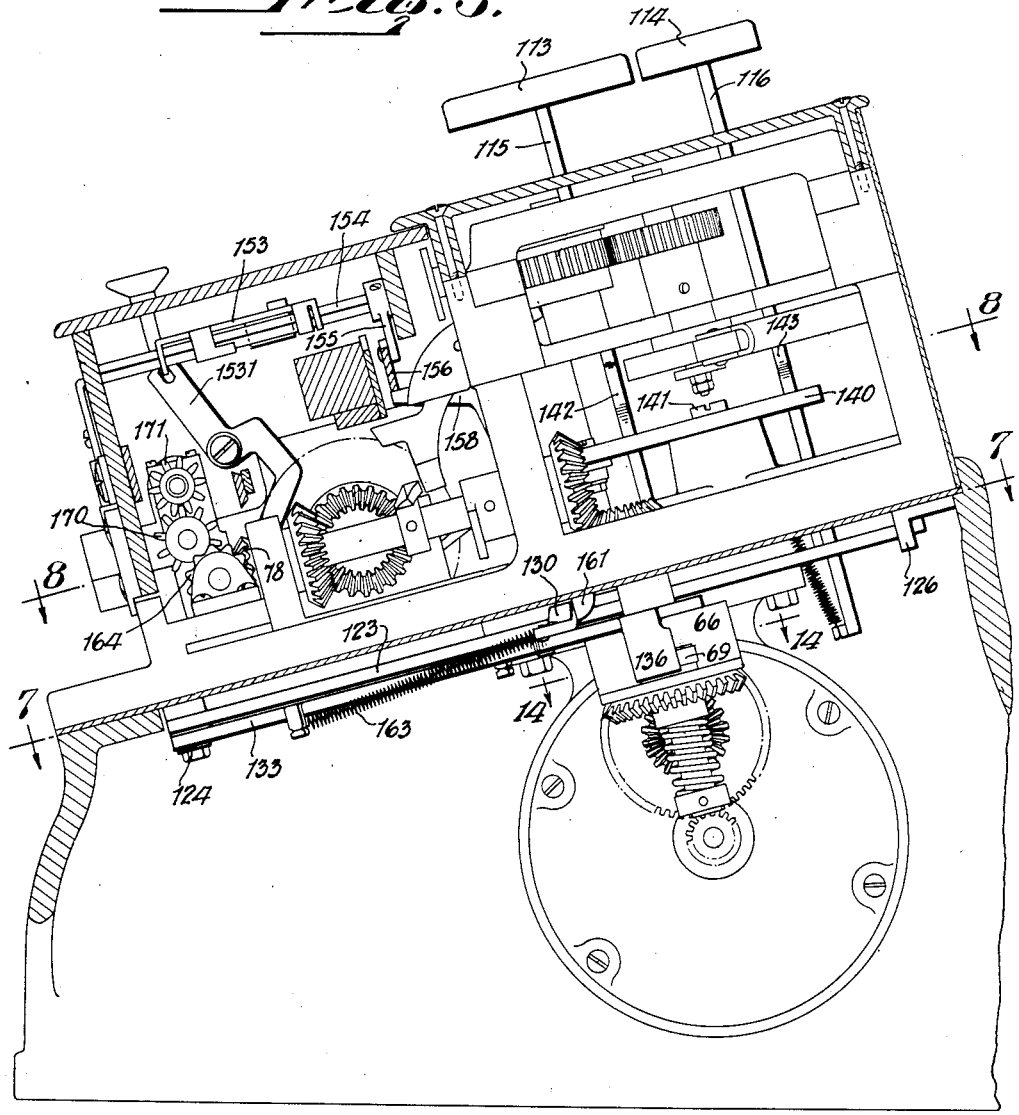

Feb. 28, 1933.　　　G. C. CHASE　　　1,898,996
CALCULATING MACHINE
Filed Jan. 3, 1930　　　8 Sheets-Sheet 4
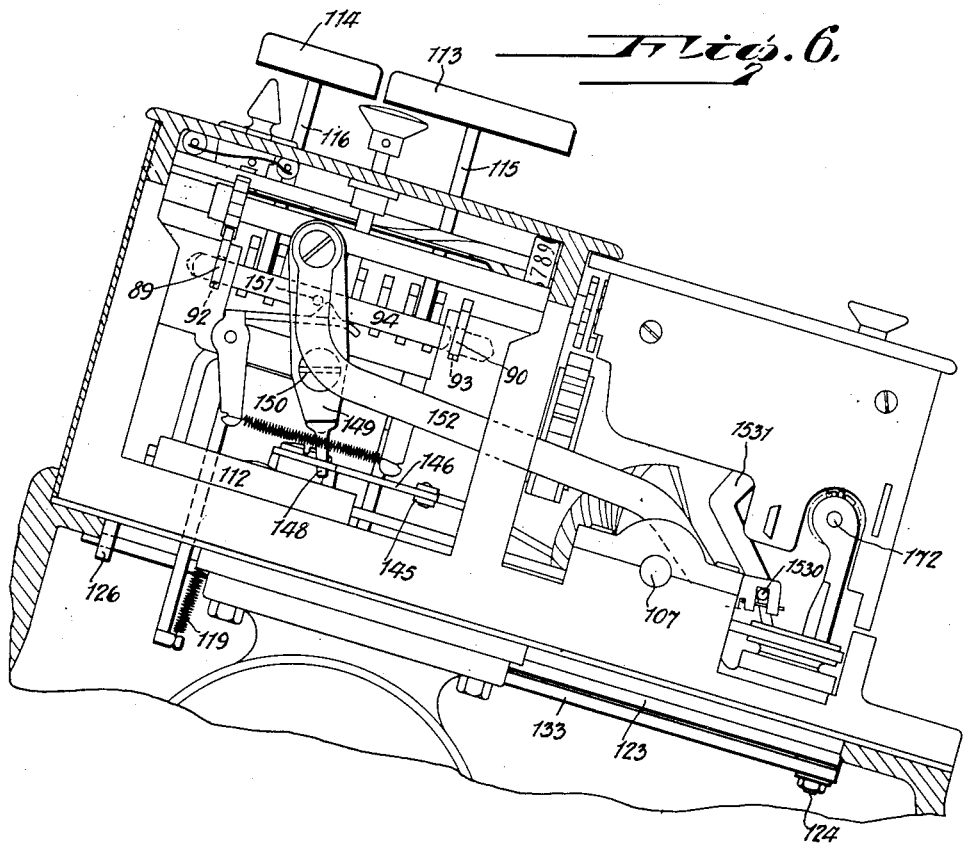
George C. Chase
INVENTOR.
BY W. A. Sparks,
his ATTORNEY.

Feb. 28, 1933.  G. C. CHASE  1,898,996
CALCULATING MACHINE
Filed Jan. 3, 1930   8 Sheets-Sheet 5
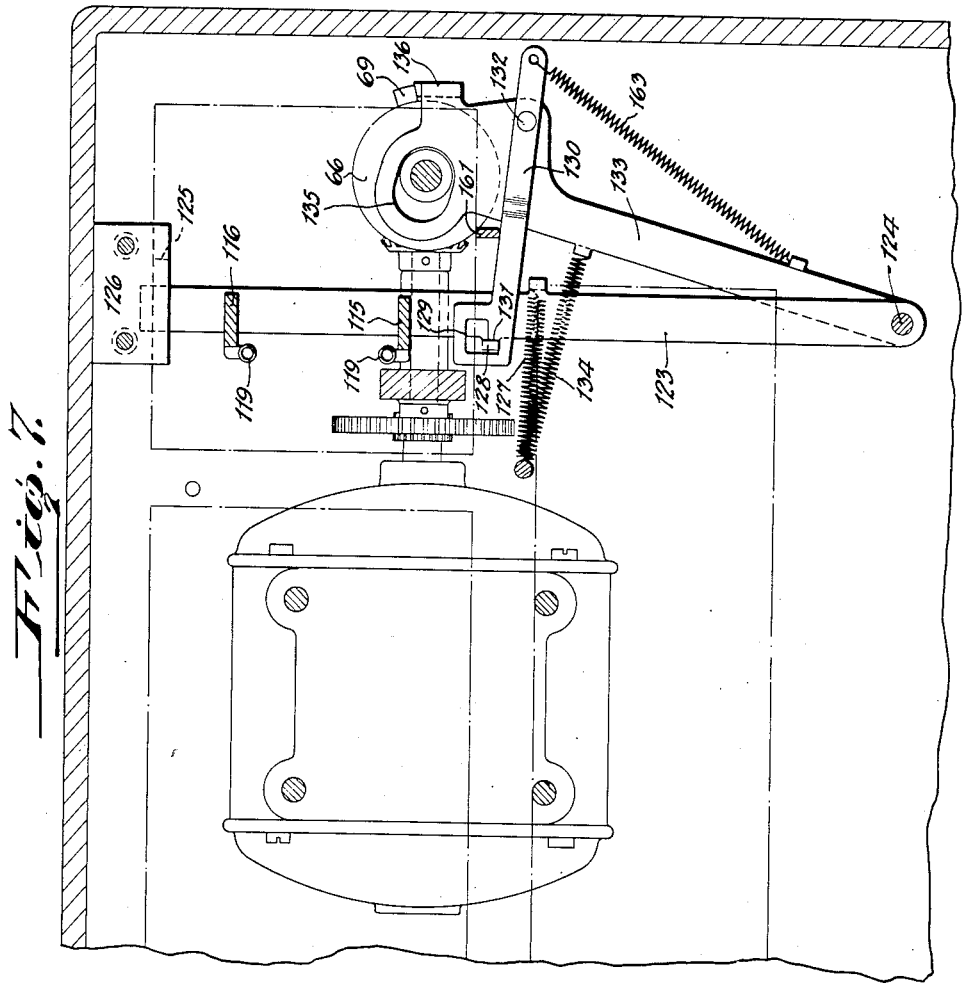
George C. Chase
INVENTOR.
BY W. A. Sparks
his ATTORNEY Feb. 28, 1933.　　　　G. C. CHASE　　　　1,898,996
CALCULATING MACHINE
Filed Jan. 3, 1930　　　8 Sheets-Sheet 6

George C. Chase
INVENTOR.
BY W. A. Sparks
his ATTORNEY.

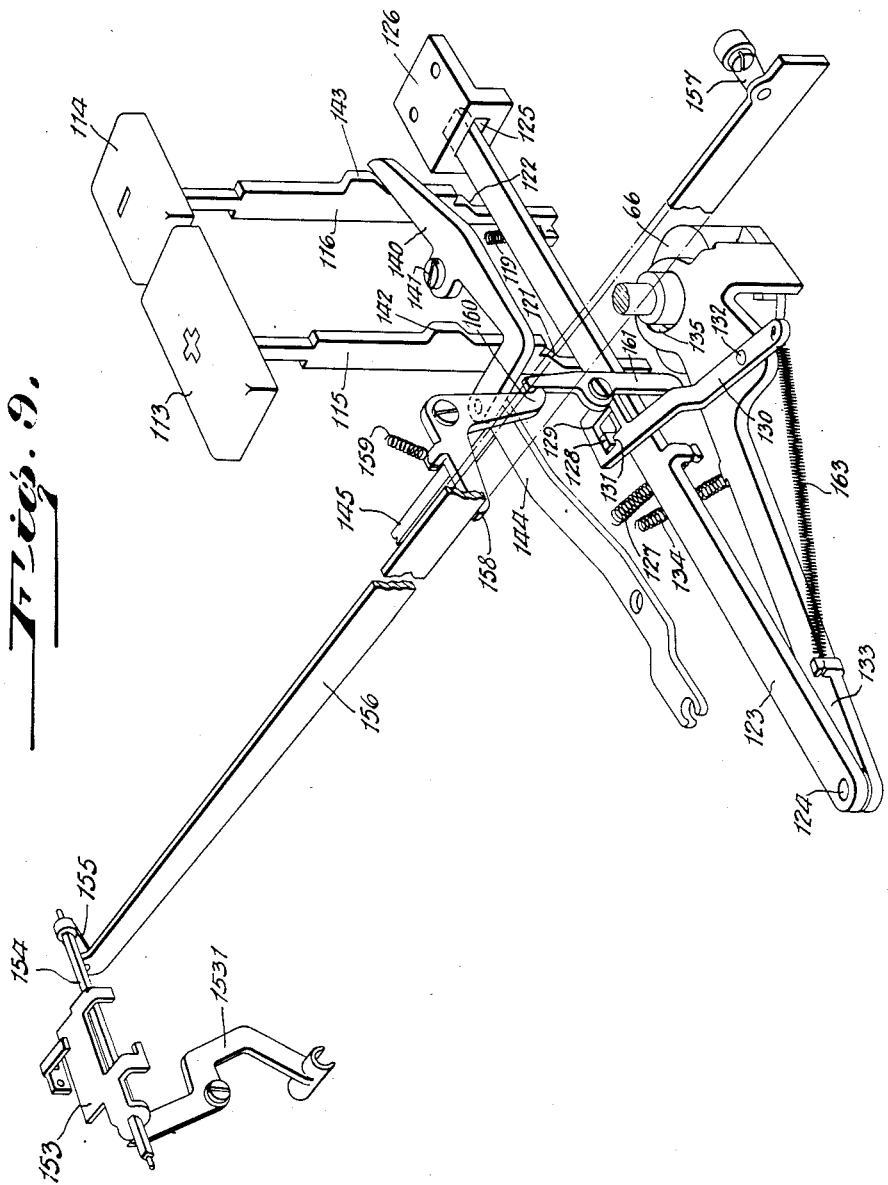

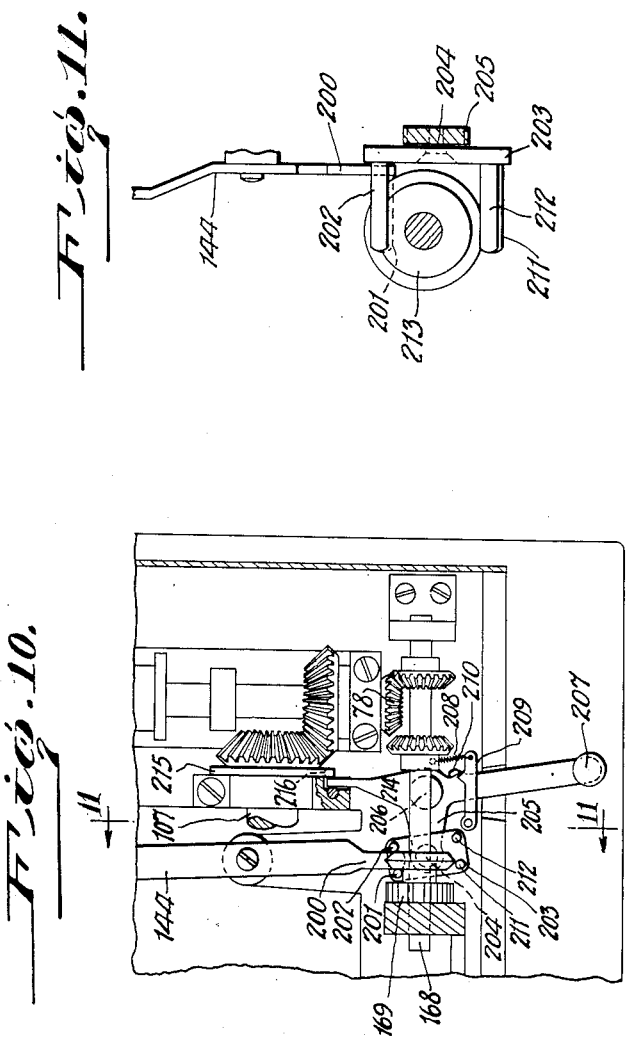

Patented Feb. 28, 1933

1,898,996

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

CALCULATING MACHINE

Application filed January 3, 1930. Serial No. 418,254.

The invention relates to calculating machines, and particularly to machines of the type wherein one-way active differentially settable numeral wheel actuating members are employed, and wherein a reversible drive is provided for the rotation counting register.

More particularly, the invention comprises means whereby the rotation counter may be set to register an amount of like or of opposite sign to the sign character of the accumulator registration, and it consists in the novel construction and combination of parts set forth in the appended claim.

In the accompanying drawings, illustrating the invention:

Figure 1 is a top plan view of a machine embodying my invention.

Figure 2 is a front elevation of the machine with the carriage removed and parts broken away to show the driving mechanism.

Figure 3 is a diagrammatic view indicating the mode of operation of the actuating racks.

Figure 4 is a fragmentary plan view showing the means for shifting the actuating racks and for controlling additive and subtractive operation thereof.

Figure 5 is a vertical sectional view taken substantially on line 5—5 of Figure 1.

Figure 6 is a similar view taken substantially on line 6—6 of Figure 1.

Figure 7 is a plan view taken substantially on line 7—7 of Figure 5.

Figure 9 is a skeletonized perspective showing the plus and minus bars and certain mechanism operable thereby.

Figure 10 is a fragmentary top plan view of the reverse gear mechanism for the revolutions counting dials.

Figure 11 is a sectional view taken substantially on line 11—11 of Figure 10.

Figure 8:
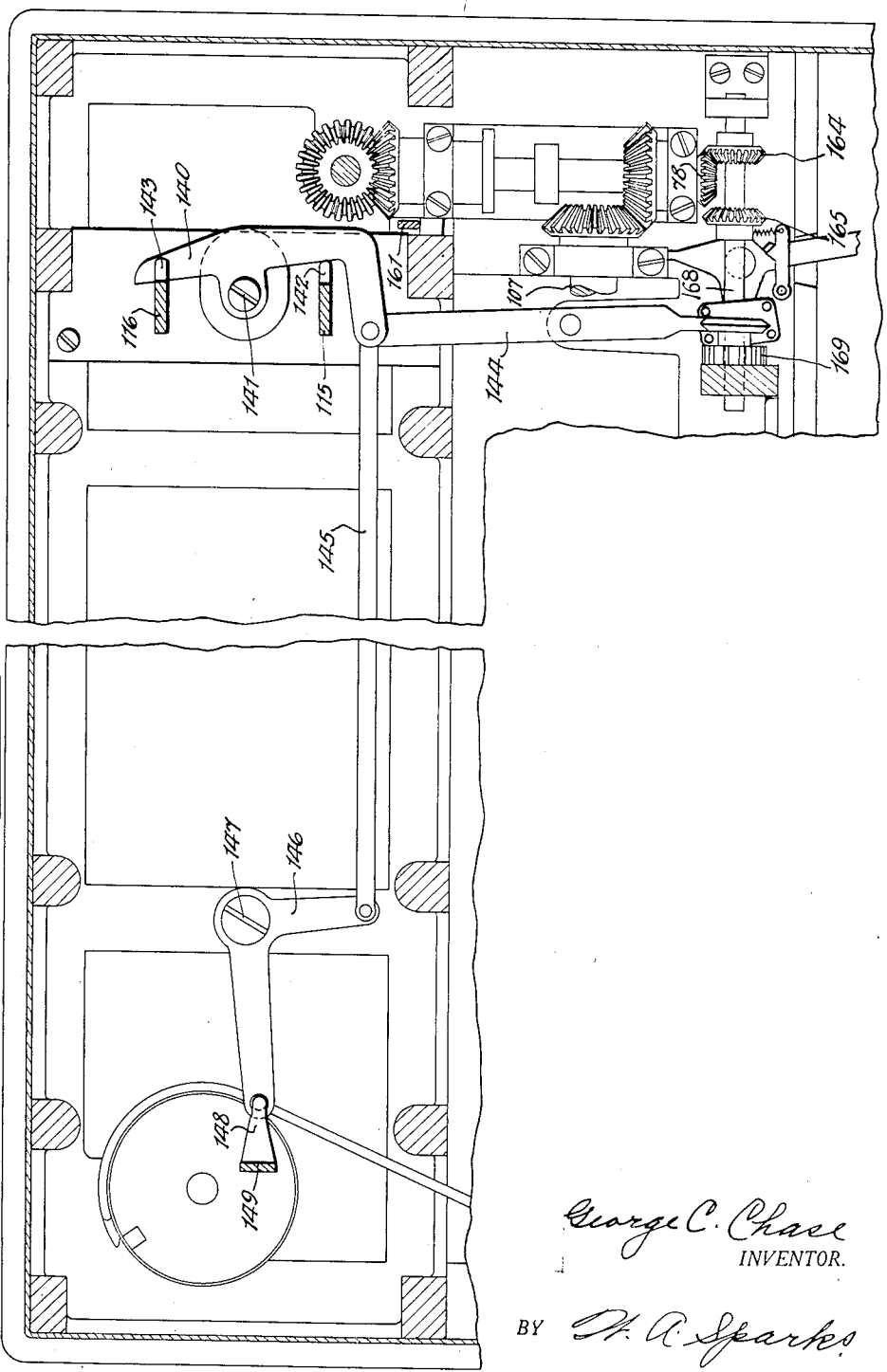
Figure 8 is a fragmentary plan view taken substantially on line 8—8 of Figure 5.

The embodiment of the invention herein illustrated includes the provision of plus and minus bars in non-reversible actuator calculating machines. The purpose of plus and minus bars is to set the mechanism for effecting positive or negative registration and to set the machine in operation. Positive and negative registration may be effected either by reverse rotation of the accumulator wheels or by complemental actuation, but in the machine illustrated herein, the latter method is used.

For the purpose of illustrating the invention, the same has been shown as applied to the well-known Mercedes structure, as shown in United States patents to Hamann Numbers 1,566,961 and 1,011,617 and as modified in the actual machine placed on the market. This is, of course, purely illustrative, as the invention is applicable to other forms of calculators.

In the drawings, the mechanism of the prior art patents and machines is shown in light lines and the new mechanism in heavy lines.

The plus and minus bars

The plus and minus bars are indicated at 113 and 114, respectively, and the stems 115 and 116 thereof have springs 119 tending to hold the bars in their uppermost position.

The stems of the plus and minus bars are provided respectively with cam surfaces 121 and 122, adapted to effect the proper rocking of a lever 123 pivoted at 124 to the under side of the machine and extending into a slot 125 in a bracket 126 also secured to the under face of the machine. This lever is constantly urged in a counter-clockwise direction as viewed from the top, by a spring 127 of Fig. 9. Lever 123 is formed with an upstanding lug 128 which projects into a bayonet slot 129 formed in one end of a latch lever 130, and, when the machine is at rest, the lug 128 normally stands to the left of the shoulder 131 of said slot.

Latch lever 130 is pivoted at 132 to a releasing lever 133 and is constantly urged in a clockwise direction (as viewed from above), by a spring 134. The releasing lever 133 is pivoted on the pivot 124 of lever 123, and is formed with an aperture 135, at its free end, which loosely embraces the hub of the clutch drum 66 and with a finger 136 which normally restrains finger 69 of the clutch mechanism, holding the same in declutched condition. This clutch is of the well-known spring-operated type illustrated in Patent 1,566,961.

It will now be apparent that, upon depressing the plus bar 113 or the minus bar 114, the cam 121 or 122 will rock lever 123, and, thru lug 128, shoulder 131 and latch lever 130, will rock the releasing lever 133 until its finger 136 is out of engagement with finger 69 of the clutch mechanism, whereupon the clutch will become effective, and the machine will be operated. Upon release of the depressed bar 113 or 114 while the machine is in operation, springs 127 and 134 will return the levers 123 and 133 to normal, with finger 136 interposed in the path of finger 69 of the clutch; and upon completion of the then current operation, finger 69 will be restrained with consequent declutching, and the machine will be stopped in full-cycle position.

The stems 115 and 116 are formed with cams 142 and 143, respectively, which, when the respective bars are depressed, engage and move a lever 140 pivoted to the frame at 141, the plus bar causing counter-clockwise rocking of lever 140 and the minus bar causing clockwise rocking of the same. Upon depressing either one of the bars, the lever 140 will be rocked into or nearly into contact with the stem of the other, so that when one bar is fully depressed, the other cannot be depressed to any effective extent, and if it is attempted to depress both simultaneously, neither can move far enough to operate the clutch mechanism.

The front end of lever 140 is pivotally connected to the rear end of a change lever 144 for controlling the revolutions counter drive mechanism, and to the right-hand end of a link 145. This link 145 is connected at its left-hand end to one arm of a bell-crank 146, Figs. 4 and 8, pivoted to the framework at 147. The other arm of bell-crank 146 is formed with an aperture to receive a finger 148 extended from a lever 149 pivoted to the framework at 150, Fig. 6. This lever 149 carries a pin 151 extending into an aperture in the bolt 94 which, in the Mercedes structure, engages apertures 92 or 93 of the racks 89 and 90 to control the addition and subtraction operations of the machine. Lever 149 also carries one end of a link 152 which extends forwardly in the machine and operates a bar 1530 which in turn operates a lever 1531 controlling a transitional operation device to be later described.

The lever 149 of the present application corresponds in its general functions to the lever 3 of said Hamann Patent #1,011,617, and has been modified by removing the finger-piece and by extending the lever downwardly so as to be operable by the link 145 and bell crank 146. The link 152 is similar to the link 140 of said Hamann patent. However, in Hamann, link 152 and bar 1530 also control automatic carriage shifting, which feature is eliminated in the present application.

*Transitional operation connections*

Whenever the registration on the accumulators passes from one sign to the other,—i. e., upon transition from positive registration to negative registration or vice-versa, the highest order accumulator effects stopping of the machine regardless of whether the plus or minus bar remains depressed or not.

In the Hamann disclosure, the passing of the highest order accumulator thru tens-transfer position during additive operations and the failure of this accumulator to pass thru such position during subtractive operations effect stopping of the machine. In Patent Number 1,011,617, member 155 is shown as slidably mounted on a round pivot rod, but in the present case a corresponding member 153 is slidably mounted on a square rock shaft 154, and at each transitional operation, the rocking of member 153 effects rocking of shaft 154. The member 153 is automatically moved along its shaft from one to the other of its positions by a lever 1531 operated by the above mentioned bar 1530, the latter being directly operated by link 152. A depending rock arm 155 is secured to shaft 154, said rock arm being pivotally connected at its lower end to one end of a bar 156 the other end of which is suported by a similar rock arm 157 pivoted on the carriage frame.

The construction is such that in normal position of member 153 the rock arms 155 and 157 are in an inclined position and the bar 156 is therefore in its uppermost position. As shown in Fig. 9, the bar 156 rests upon the forwardly extending arm of a bell-crank 158 pivotally supported by the machine frame and constantly urged in a clockwise direction (as viewed from the right), by a spring 159. The lower arm of the bell-crank 158 is provided with a nose 160 which bears against the upper end of a lever 161 in engagement with lever 130 of the clutch controlling mechanism.

When a transitional operation occurs, the member 153 is rocked by the means known in the prior art, which causes arm 155 to effect a slight depression of bar 156 thereby rocking levers 158, 161 and 130, so that the lug 128 comes into the main portion of the slot 129 and out of engagement with shoulder 131, whereupon spring 134 moves the clutch control lever 133 back to position to effect declutching of the machine upon the completion of the current cycle of operation. The bar 156 and connected parts are returned to normal by bell-crank 158, and lever 123 is returned to normal upon the release of the depressed operating bar, by the action of spring 127, whereupon shoulder 131, on the latch lever 130, is again brought into engagement with lug 128, by means of spring 163.

Reversible revolution counters

The operating mechanism drives a beveled gear 78 which in turn drives either of two beveled gears 164 and 165 according to the direction in which the cycle counters or multiplier and quotient dials 166 are to be driven. The intermediately pivoted lever 144 controls the shifting of the gears 164 and 165 to mesh the desired one with the driving gear 78.

From the construction shown, it will be obvious that depression of the plus bar and consequent counter-clockwise rocking of lever 140 will cause clockwise rotation of lever 144 thereby effecting shifting of gear 164 into mesh with driving gear 78; and, in like manner, depression of the minus bar will effect clockwise rocking of lever 140, counter-clockwise rocking of lever 144, and shifting of gear 165 into mesh with driving gear 78.

The beveled gears 164 and 165 are secured to one end of a shaft 168, which, near its other end carries a gear 169. This gear 169 meshes a wide idler 170 which in turn meshes a gear 171 on the revolution counter actuating shaft 172. This actuating shaft is not shown in accordance with the Hamann patents but is similar to the shaft as actually used in the Mercedes machine.

The tens-transfer mechanism for the multiplier and quotient registers is also different from that shown in said patents but is like that in the manufactured machine.

The clearing mechanism for the product and quotient registers is the same as in said Hamann Patent Number 1,011,617.

In Hamann, special means are provided for locking the revolution-counter-drive-reversing devices against shifting except when the machine is in full-cycle position; but in the present disclosure the reversing means above described needs no special lock, as the bolt 94 is locked against shifting except in full-cycle position and is connected, as above set forth, to lever 144 so that the latter is thereby locked and needs no additional locking device.

As the plus and minus bars control shifting on the revolutions-counter-reverse gears, it is necessary for division, to provide means for reversing the shifting effect of the lever 144. To this end, the lever 144 is formed with a finger 200, which extends between pins 201 and 202 of a plate 203 pivoted at 204 to a rocker arm 205. Member 205 is pivoted at 206 to the base plate of the machine, and is formed with a manipulative element 207 extending forwardly thru a slot in the machine frame. A spring 208 and click-pawl 209 cooperate with a lug 210 on member 205 to hold the lever in either of its positions. The plate 203 carries also pins 211 and 212. The disk of the gear shift mechanism, shown at 213, is made somewhat thicker and beveled on its edges.

In Fig. 10 the lever 144 and disk 213 are shown in the position assumed normally upon depression of the plus bar for multiplication. The finger 200 and the edge of disk 213 are between pins 201 and 202, and disk 213 is in its leftmost or additive-drive position. When now, one wishes to perform division, one shifts element 207 to the left, whereby moving plate 203 rearwardly, pins 201 and 202 riding along finger 200. As the movement progresses, pin 211 engages the left-hand beveled edge of disk 213, shifting the disk to its right-hand or subtractive-drive position, so that the operation of 144 will thereafter cause pins 211 and 212 to shift disk 213, resulting in a reverse effect on the counter drive from that which would be effected with lever 205 in the position shown in the drawings. In other words, with plate 203 forward, additive registration on accumulators is accompanied by additive registration on the counter, and subtractive registration on accumulators, by subtractive registration on the counter; but with plate 203 rearward, additive registration on accumulators is accompanied by subtractive registration on the counter, and subtractive registration on accumulators by additive registration on the counter.

In order to prevent shifting of lever 205 when the machine is not in full-cycle position, the lever is formed with a finger 214 which must pass through the plane of a disk 215 in passing from one position to another. Disk 215 is secured on shaft 107 and is formed with a notch 216 which is only in line with the end of finger 214 when the machine is in full-cycle position.

It is immaterial whether there are two sets of reversing gears between the motor and the reversible counter-actuating shaft 172, one set controlled by plus and minus bars and the other set controlled by a change lever, or one set of gears provided with a dual control, one control from the plus and minus bars and the other from the change lever as shown in Figs. 10 and 11.

Operation

The operations of addition and subtraction are performed in substantially the same manner as in said Hamann patents, except that the plus bar is depressed and immediately released for addition and the minus bar is depressed and immediately released for subtraction.

In multiplication the operator after setting up the multiplicand moves the carriage to proper positions and depresses the plus bar at each position, holding it depressed until the required digit of the multiplier appears on the multiplier register. When the entire multiplier appears on the multiplier register, the product will appear in the accumulators 105.

In division, the dividend is set in the accumulators, the divisor is set on the keyboard, and the carriage is moved to position for starting, all as in Hamann. The minus bar is then depressed and held depressed until a transitional operation occurs. This, thru square shaft 154, bar 156 and parts described as operated thereby, effects declutching. The depression of the minus bar caused shifting of lever 144 to cause positive registration on the quotient register. The dial of the quotient register operated during the depression of the subtract key will now show a digit one higher than the proper digit of the quotient.

The minus bar is now released, the carriage shifted one space to the left, and the plus bar depressed, which causes additive operation until a transitional operation occurs, and leaves the correct quotient figure registered upon the two higher order wheels 167. This is the well-known "subtract-shift-add-shift" method of division.

I claim:

In a calculating machine having numeral wheels, one-way active differential settable actuators therefor, operating devices adjustable to determine and effect positive or negative registration on said numeral wheels, and a rotation counting train including reversing gears and a shift lever therefor settable by said operating devices to register in accordance with the numeral wheel registration; a second lever interposed between said reversing gears and said first named lever, and means for adjusting the fulcrum of said second lever to reverse the operative effect of the first lever.

Signed at Orange in the county of Essex and State of New Jersey this 30 day of December A. D., 1929.

GEORGE C. CHASE.